United States Patent [19]

Skrydstrup

[11] 4,028,727

[45] June 7, 1977

[54] MIX/EFFECTS SWITCH ARRANGEMENT AND MIX/EFFECTS SWITCHING SYSTEM

[75] Inventor: Ole Skrydstrup, Pointe Claire, Canada

[73] Assignee: Central Dynamics Ltd., Canada

[22] Filed: May 7, 1976

[21] Appl. No.: 684,360

[52] U.S. Cl. .............................. 358/181; 358/182; 358/183

[51] Int. Cl.² ......................................... H04N 5/22

[58] Field of Search .............. 178/DIG. 6; 358/181, 358/182, 183

[56] References Cited

UNITED STATES PATENTS

| | | | |
|---|---|---|---|
| 3,604,849 | 5/1969 | Skyrdstrup | 178/DIG. 6 |
| 3,728,479 | 4/1973 | Srinivasan | 178/DIG. 6 |
| 3,936,868 | 2/1976 | Thorpe | 178/DIG. 6 |
| 3,970,774 | 7/1976 | Bazin | 178/DIG. 6 |

Primary Examiner—Howard W. Britton
Attorney, Agent, or Firm—Diller, Brown, Ramik & Wight

[57] ABSTRACT

This invention relates to a mix/effects switch arrangement and a mix/effects switching system including the switch arrangement. The mix/effects switch arrangement includes five switches each of which has two input terminals, an output terminal and a control terminal. One of the switches is the output switch, and a first and second one of the remaining switches are serially arranged to constitute an input to one of the input terminals of the output switch. The remaining two switches are serially arranged in parallel to constitute the input to the other input terminal of the output switch. At least the output switch constitutes a soft switch, and, preferably, the two input switches also are soft switches. In the switching system, a source of first background video signal is applied to one input terminal of an input switch, and a source of second background video signal is applied to one input of the other input switch. The second inputs of the input switches are then connected together and to a source of foreground video signal. The outputs of the input switches are connected to one input terminal of the second switches in the serial arrangements, and the second input terminals of the second switches are connected together and to a source of matte video signal. The control terminals are controlled by chroma key or split screen sources and a title source, and the control terminal of the output switch is controlled by a fader lever and mode selector means. The control terminals of the first four switches are further controlled by three push button means whose outputs are connected to a logic control circuit so that a selected one or more of the four switches are actuated in dependence on the push buttons pressed and in accordance with a prearranged program.

11 Claims, 4 Drawing Figures

MIX/EFFECTS SWITCH ARRANGEMENT AND MIX/EFFECTS SWITCHING SYSTEM

BACKGROUND OF THE INVENTION

1. Field of the Invention

This invention relates to a novel mix/effects switch arrangement for television video signals. In addition, this invention relates to a novel mix/effects switching system employing such a novel mix/effects switch arrangement.

2. Statement of the Prior Art

U.S. Pat. No. 3,604,849, issued Sept. 14, 1971, describes a mix/effects system which accommodates television effects such as mixing, wiping, keying etc. on two video inputs applied to the system. Because the system can receive only two inputs, its range of performance is limited. Thus, it is not possible to go from a mix to a key, as this requires three inputs.

In order to increase the versatility of switching effects available, the mix/effects systems of the above patent have been arranged in circuit with up to three systems in tandem. In these arrangements, the first system is fed from either two video sources or a key and a video source. The output of the first system is fed to one input of a second system, and the second input to the second system is a second video source. The output of the second system is, in turn, fed to one input terminal of a third system whose second input terminal is connected to a third video source.

The difficulty with this arrangement is that each mix/effects system is separately controlled by a different control lever. In the control room, the operator is required to handle these various levers to create various effects under conditions of substantial pressure. Decisions have to be made speedily, and an error resulting from the selection of the wrong lever, or from moving the right lever in the wrong direction, can have noticeably undesirable effects.

In addition, connecting the mix/effects system into an arrangement for handling more than two inputs requires a substantial amount of hardware which is expensive, and which reduces reliability and increases maintenance difficulties.

SUMMARY OF THE INVENTION

It is therefore an object of the invention to provide a novel mix/effects switch arrangement which is capable of accepting more than two inputs.

It is a further object of the invention to provide a mix/effects switch arrangement which can receive four inputs.

It is a still further object of the invention to provide a mix/effects switching system employing such a mix/effects switch arrangement.

It is a more specific object of the invention to provide such a mix/effects switching system which can receive a key input, a foreground input and two background inputs.

It is a further object of the invention to provide such a mix/effects switching system which requires only a single control lever, along with appropriate push button or the like switches, for the operation thereof.

In accordance with the invention a mix/effects switch arrangement comprises: a plurality of switches, each of said switches comprising two input terminals, an output terminal and a control terminal; one of said switches comprising an output switch; a first number of said plurality of switches being serially arranged to provide a first feed line to one input terminal of said output switch; a second number of said plurality of switches being serially arranged to provide a second, parallel, feedline to the other input terminal of said output switch; said output switch comprising a soft switch.

Preferably, said plurality of switches comprises five switches; said first number comprising a second switch and a third switch and said second number comprising a fourth switch and a fifth switch; the output terminal of said second switch being connected to one input terminal of said third switch, the output terminal of said third switch being connected to one input terminal of said output switch; the output material of said fourth switch being connected to one input terminal of said fifth switch, the output terminal of said fifth switch being connected to the other output terminal of said output switch.

The other input terminals of said second and fourth switches may be connected together and the other input terminals of said third and fifth switches may be connected together.

The second and fourth switches may comprise soft switches, and said third and fifth switches may comprise soft switches or hard switches.

In another aspect, a mix/effects switching system comprises a mix/effects switch arrangement including: a plurality of switches, each of said switches comprising two input terminals, an output terminal and a control terminal; one of said switches comprising an output switch; a first number of said plurality of switches being serially arranged to provide a first feed line to one input terminal of said output switch; a second number of said plurality of switches being serially arranged to provide a second, parallel, feedline to the other input terminal of said output switch; said output switch comprising a soft switch.

The plurality of switches may comprise five switches; said first number comprising a second switch and a third switch and said second number comprising a fourth switch and a fifth switch; the output terminal of said second switch being connected to one input terminal of said third switch, the output terminal of said third switch being connected to one input terminal of said output switch; the output terminal of said fourth switch being connected to one input terminal of said fifth switch, the output terminal of said fifth switch being connected to the other output terminal of said output switch; a source of first background video signal connected to one input terminal of said second switch and a source of second background video signal connected to one input terminal of said fourth switch, and a source of foreground video signal connected in common to the other input terminals of said second and fourth switches; and a fourth source of video matte signal connected in common to the other input terminals of said third and fifth switches.

In an embodiment, a chroma key or split screen source is connected in common to the control terminals of said second and fourth switches; a title source is connected in common to the control terminals of said third and fifth switches; and fader lever and mode selector means is connected to the control terminal of said output switch.

Three push button means may be connected to a logic control circuit, the output of said logic control circuit being connected to the control terminals of said second, third, fourth and fifth switches; whereby to activate a selected one or more of said second, third, fourth or fifth switches in dependence on the push buttons depressed in accordance with a prearranged program.

BRIEF DESCRIPTION OF THE DRAWINGS

The invention will be better understood by an examination of the following description, together with the accompanying drawings, in which.

DETAILED DESCRIPTION OF THE DRAWINGS

Figure 1:
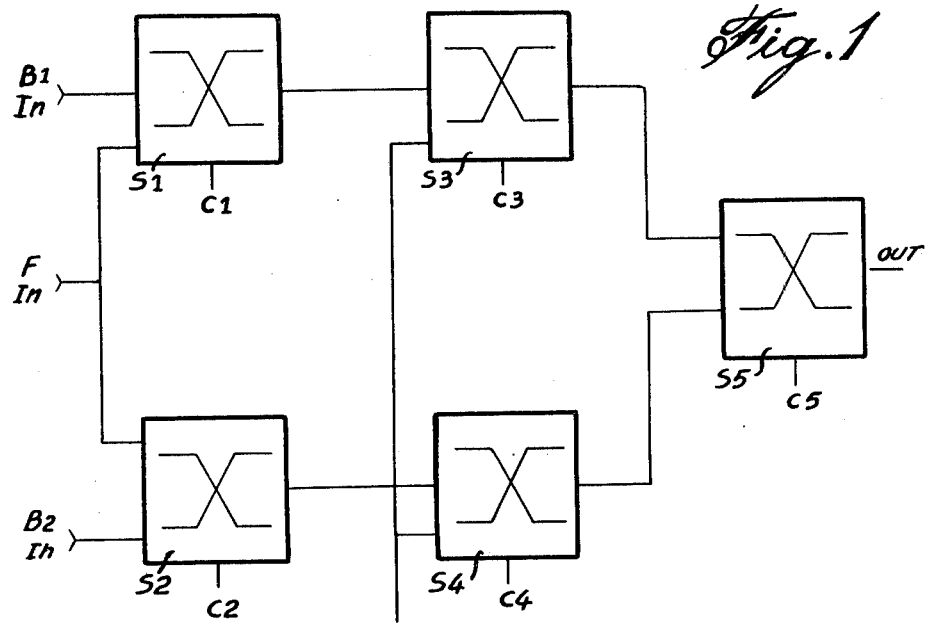
FIG. 1 illustrates, in block diagram form, one embodiment of a mix/effects switch arrangement in accordance with the invention.

Referring now to FIG. 1, the novel switch arrangement consists of five switches, S1, S2, S3, S4 and S5. Each of the switches includes two input terminals and a single output terminal, and switch S5 comprises the output switch of the arrangement. Switches S1 and S3 are arranged in series to provide a feedline to one input terminal of S5, and switches S2 and S4 are arranged in series to provide a parallel second feedline to the other input terminal of S5. Each of the switches include respective control terminals C1, C2, C3, C4 and C5.

All of the switches shown in FIG. 1 are soft switches which are defined as follows:

A two input switching element providing a gradual changeover between two input signals in a proportional manner to the amplitude of a control signal, i.e., if the input signals are A and B and the control signal C where $0 \leq C \leq 1$, the output signal will take the form of $[A \times C] + [(1-c) \times B]$. Hence, if C is 0, only B signal is passed through and if C is 1, only the A signal. For values of C between 0 and 1 a mixture of the two signals occurs. The frequency range for the control signal may be anywhere from DC to the highest frequency in the video spectrum, typically 5MHz. This means that a single Soft Switch is capable of performing a dissolve between two video signals (C frequency = DC) and an instantaneous switch (C frequency very high) or any combination of the two by varying only the control signal. Wideband analog multipliers, such as the MC 1495, will perform all of these functions.

Figure 3:
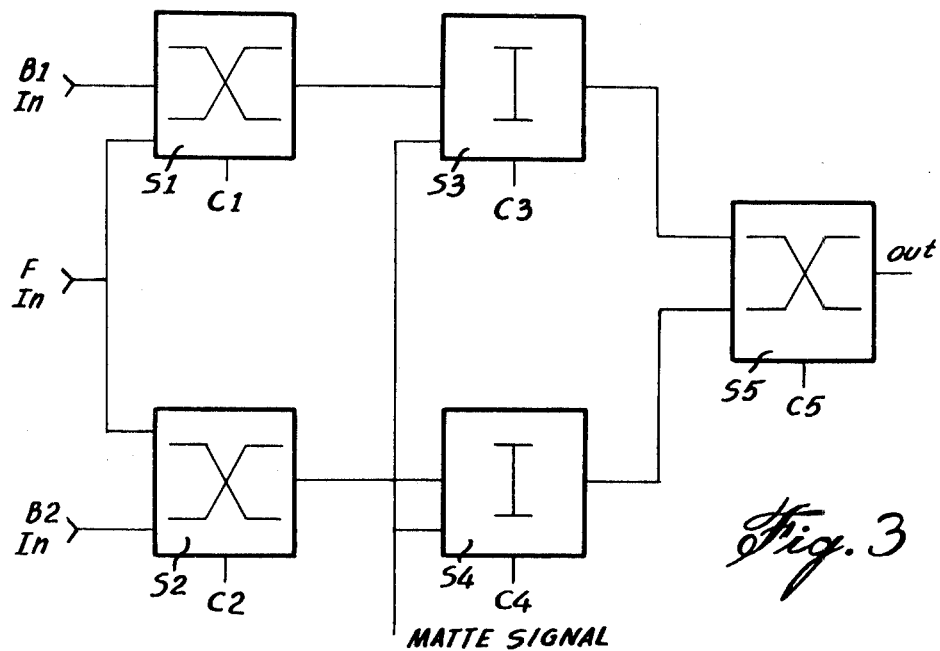
FIG. 3 illustrates a second embodiment of a mix/effects switch arrangement.

The soft switches herein are contrasted to hard switches such as shown at S3 and S4 in FIG. 3. A hard switch is defined as follows:

A two input switching element providing instantaneous changeover between two video signals. Only a digital type of control signal is accepted to affect the changeover.

Returning now to FIG. 1, switch S1 has a first signal such as a background signal B1 In connected to one input terminal thereof, and a second signal, such as a background signal, B2 In is connected to one input terminal of S2. The second input terminals of both S1 and S2 are connected to a common source such as foreground signal F In. The background signals and the foreground signals are, of course, video signals.

The output terminal of S1 is connected to one input of S3, and the output of S2 is connected to one input of S4. The other input terminals of S3 and S4 are connected to a common source such as the matte signal source, and the output of S3 is connected to one input of S5 while the output of S4 is connected to the other input of S5. The output of S5 constitutes the program output and would be supplied to a transmitter as is well known in the art. In addition, the outputs of S3 and S4 can be provided to piloting monitors as is also well known in the art.

Figure 2:
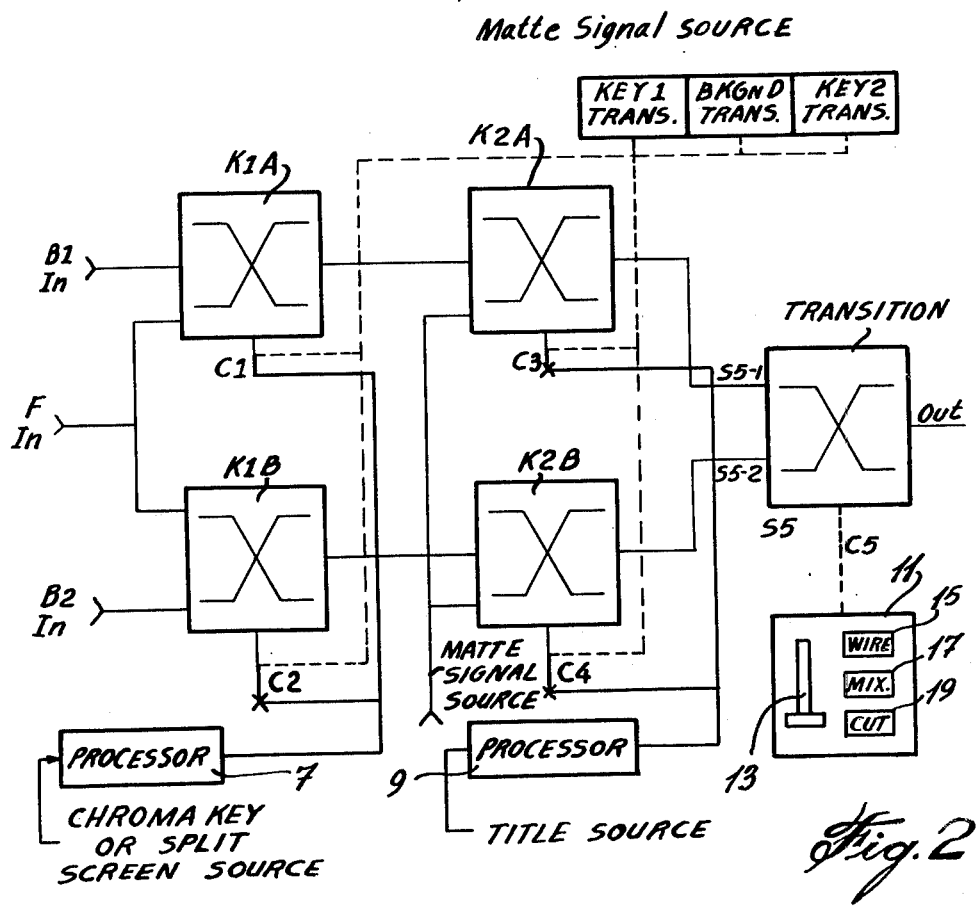
FIG. 2 is a block diagram of a mix/effects switching system consisting of the mix/effects switch arrangement with peripheral attachments.

Turning now to FIG. 2, the switches S1 to S4 are referenced here as k1A, k1B, k2A and k2B respectively. The control terminals, C1 to C4, which receive control signals for activating their respective switches, are connected to push button switches 1, 3 and 5 which comprise respectively, key 1, transition, background transition and key 2 transition switches. The push button switches are, in turn, connected to a logic circuit, and the particular combination of control terminals which will receive activating signals with the depression of different combinations of the switches 1, 3 and 5 is illustrated in the truth table below. In addition, control terminals C1 and C2 receive inputs from a chroma key or split screen source through processor 7 and terminals C3 and C4 receive inputs from a title source through processor 9. Chroma key or split screen sources and the title sources are well known in the art as are also processors 7 and 9 for controlling the operation of their respective switches. Control terminal C5 is connected to the output of fader lever and mode selector means 11 which includes a fader lever 13 and mode selector push buttons 15, 17 and 19. The means 11 will include a pattern generator, activated by the mode selector buttons, to generate the appropriate pattern for the wipe, mix or cut modes.

Included below is a truth table which illustrates the effects achieved by activating different combinations of the push buttons 1, 3 and 5:

TABLE 1

| Position | Key 1 transition | Background transition | Key 2 transition | K1 on air | K2 on air | K1A | K1B | K2A | K2B | B1 & B2 lock | EFFECTS |
|---|---|---|---|---|---|---|---|---|---|---|---|
| 1 | 1 | 1 | 1 | 1 | 1 | 1 | 0 | 1 | 0 | 0 | Change background and lose simultaneously chroma key and title. |
| 2 | 1 | 1 | 1 | 0 | 1 | 0 | 1 | 1 | 0 | 0 | Change background and add chroma key but lose title. |
| 3 | 1 | 1 | 1 | 1 | 0 | 1 | 0 | 0 | 1 | 0 | Change background and lose chroma key but add title. |
| 4 | 1 | 1 | 1 | 0 | 0 | 0 | 1 | 0 | 1 | 0 | Change background and add chroma key and title. |
| 5 | 1 | 1 | 0 | 1 | 1 | 1 | 0 | 1 | 1 | 0 | Change background and lose chroma key but retain title. |
| 6 | 1 | 1 | 0 | 0 | 1 | 0 | 1 | 1 | 1 | 0 | Change background and add chroma key and retain title. |
| 7 | 1 | 1 | 0 | 1 | 0 | 1 | 0 | 0 | 0 | 0 | Change background and lose chroma key — no title. |
| 8 | 1 | 1 | 0 | 0 | 0 | 0 | 1 | 0 | 0 | 0 | Change background and add chroma key — no title. |
| 9 | 1 | 0 | 1 | 1 | 1 | 1 | 0 | 1 | 0 | 1 | Same background — lose chroma key and title. |
| 10 | 1 | 0 | 1 | 0 | 1 | 0 | 1 | 1 | 0 | 1 | Same background — add chroma key and lose title. |
| 11 | 1 | 0 | 1 | 1 | 0 | 1 | 0 | 0 | 1 | 1 | Same background — lose chroma key and add title. |
| 12 | 1 | 0 | 1 | 0 | 0 | 0 | 1 | 0 | 1 | 1 | Same background — add chroma key and title. |
| 13 | 1 | 0 | 0 | 1 | 1 | 1 | 0 | 1 | 1 | 1 | Same background — lose chroma key but leave title. |

TABLE 1-continued

| Position | Key 1 transition | Background transition | Key 2 transition | K1 on air | K2 on air | K1A | K1B | K2A | K2B | B1 & B2 lock | EFFECTS |
|---|---|---|---|---|---|---|---|---|---|---|---|
| 14 | 1 | 0 | 0 | 0 | 1 | 0 | 1 | 1 | 1 | 1 | Same background — add chroma key and leave title. |
| 15 | 1 | 0 | 0 | 1 | 0 | 1 | 0 | 0 | 0 | 1 | Same background — lose chroma key — no title. |
| 16 | 1 | 0 | 0 | 0 | 0 | 0 | 1 | 0 | 0 | 1 | Same background — add chroma key — no title. |
| 17 | 0 | 1 | 1 | 1 | 1 | 1 | 1 | 1 | 0 | 0 | Change background behind chroma key and lose title. |
| 18 | 0 | 1 | 1 | 0 | 1 | 0 | 0 | 1 | 0 | 0 | Change background — lose title — no chroma key. |
| 19 | 0 | 1 | 1 | 1 | 0 | 1 | 1 | 0 | 1 | 0 | Change background behind chroma key and bring in title — opposite side to 17. |
| 20 | 0 | 1 | 1 | 0 | 0 | 0 | 0 | 0 | 1 | 0 | Change background and add title — no chroma key. |
| 21 | 0 | 1 | 0 | 1 | 1 | 1 | 1 | 1 | 1 | 0 | Change background behind chroma key and title. |
| 22 | 0 | 1 | 0 | 0 | 1 | 0 | 0 | 1 | 1 | 0 | Change background behind title only. |
| 23 | 0 | 1 | 0 | 1 | 0 | 1 | 1 | 0 | 0 | 0 | Change background behind chroma key only. |
| 24 | 0 | 1 | 0 | 0 | 0 | 0 | 0 | 0 | 0 | 0 | Change background only. |
| 25 | 0 | 0 | 1 | 1 | 1 | 1 | 1 | 1 | 0 | 1 | Transition from chroma key and title to chroma key only over same background. |
| 26 | 0 | 0 | 1 | 0 | 1 | 0 | 0 | 1 | 0 | 1 | Transition from title only over same background. |
| 27 | 0 | 0 | 1 | 1 | 0 | 1 | 1 | 0 | 1 | 1 | Transition from chroma key and title to chroma key only over same background — opposite side to 25. |
| 28 | 0 | 0 | 1 | 0 | 0 | 0 | 0 | 1 | 1 | 1 | Transition to title only over same background — side to 26. |

In the truth table, columns 2, 3 and 4 relate to the status of push buttons 1, 3 and 5 respectively. 1 indicates that the push button is activated, and a 0 indicates that the push button is not activated. Columns 5 and 6 indicate the status of the $k1$ and $k2$ switches respectively before the switch buttons 1, 3 and 5 are put into the status as shown in the preceding three columns. Thus, a 1 under the column $k1$ on air indicates that $k1a$ or $k1b$ or both were activated.

The next four columns show the status of the switches $k1a$, $k1b$, $k2a$ and $k2b$ respectively after the push buttons 1, 3 and 5 are activated as shown in columns 2, 3 and 4. A 1 indicates that the respective switch is activated, whereas a 0 indicates that it is not activated.

In accordance with the terminology employed, when the K switches are unactivated, they will pass the background signals exclusively, whereas, when they are activated, they will pass the foreground signals exclusively. In addition, the K switches can be controlled to be activated and deactivated in accordance with a specific pattern. Thus, when the split screen source is applied to a control terminal, the switch will be activated for half of each line and deactivated for the other half, so that what appears on the screen is half a screen (one side) of foreground and the other half (other side) of background. Appropriate switching will "cut a hole" in the screen for the insertion of a title or the like.

Further, the switches can be controlled so that a mixture of both input signals will appear at the output, and the relative intensities of the signals can be controlled at the output so that, what appears on the screen, is a mix effect, i.e., both background and foreground are seen, but one is fainter than the other.

Such controlling to produce effect, is well known in the art as are also sources for providing such control.

In switch S5, a gradual transition is made from one side of the switch to the other by movement of the fader lever 13.

Column 11 indicates whether or not there are identical signals at $b1$ and $b2$. A 1 indicates that the signals at $b1$ and $b2$ are identical, whereas a 0 indicates that $b1$ and $b2$ are different.

To understand the operation of the system, we will consider the effect in various positions of the truth table above. Considering position 24, with $k1$ and $k2$ off the air, and $b1$ and $b2$ not being identical, push button 3 is depressed. This will leave all of switches $k1a$, $k1b$, $k2a$ and $k2b$ in the non-activated status. Accordingly, the $b1$ signal will pass through the $k1a$ switch and the $k2a$ switch and the foreground will be blocked in both the switches so that only the $b1$ signal will be provided to the respective input terminal of switch S5. In the same way, only the $b2$ signal will be provided to the other input terminal of switch S5. If we assume that the lever arm 13 is set so that switch S5 is passing only the $b1$ signal, a transition from $b1$ to $b2$ can be effected by appropriately moving the lever arm 13.

Considering the number 1 position with $k1$ on air and $k2$ on air, all of buttons 1, 3 and 5 are depressed. This will activate switches $k1a$ and $k2a$ so that the terminal S5-1 of switch S5 will be receiving a composite signal consisting of the background $b1$, chroma key and a title. Switches $k1b$ and $k2b$ are not activated, so that terminal S5-2 will be receiving only a background signal $b2$. If the lever 13 was originally set so that only the signal received on S5-1 would be passed through switch S5, the output of S5 would be a first background with a chroma key and a title. When the lever 13 is moved to its other position, the background will change to background $b2$, and the chroma key and title source will be lost.

In a final example, we will consider position 13 in the truth table. Here, with $k1$ and $k2$ on the air, push button 1 is depressed. This will activate $k1a$, $k2a$ and $k2b$ while leaving $k1b$ unactivated. In this position, $b1$ and $b2$ are identical. As can be seen, S5-1 in this position will be receiving a signal consisting of the background $b1$, the chroma key and the title. S5-2 will be receiving a signal consisting of the same background and the title. If lever 13 is adjusted initially so that the input of S5-1 is being supplied to the output of S5, then with the movement of the lever to its opposite position, the output will be changed from a background with a chroma key and a title to a background with only a title. The chroma key is lost.

It is believed that, with the foregoing descriptive examples, and with the aid of the complete truth table, the effects which can be achieved by depressing different combinations of switch buttons 1, 3 and 5 and the operation of the fader lever 13 can be determined. As is quite clear, a large number of effects can be achieved, and it is relatively simple to move from one effect to another with a minimum of effort on the part of the operator and in a very short time.

In alternative embodiments, as can be seen in FIG. 3, the soft switches S3 and S4 of FIG. 1 can be replaced with hard switches S3 and S4 of FIG. 3. This will effect the operation of the system only in that the transitions effected by the switches S3 and S4 will be hard (instantaneous) rather than soft (gradual), however, in all other respects, the operation of the FIG. 3 embodiment is the same as the operation of the FIG. 1 embodiment.

Figure 4:
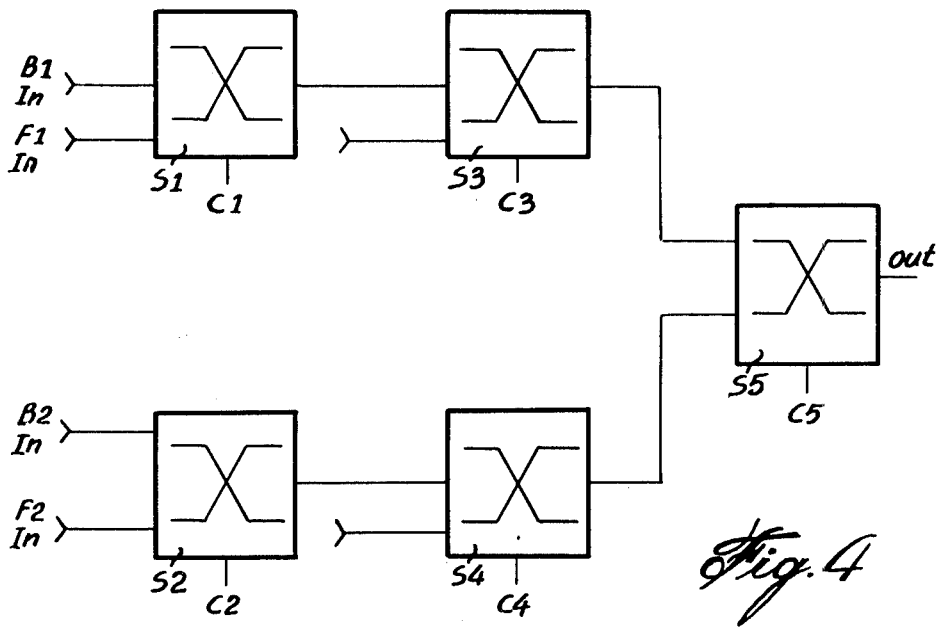
FIG. 4 illustrates a third embodiment of the mix/effects switch arrangement.

In the FIGS. 1 and 3 embodiments, four inputs can be received by the system. To increase the possible number of inputs, two foreground signals can be provided instead of a single foreground signal, and such an arrangement is shown in FIG. 4. When two foreground signals are supplied, then the system can receive signals from five separate sources. If the second inputs to switches S3 and S4 are also connected to separate sources, then the system will be capable of accepting six separate signals.

It can be seen that the novel mix/effects switch arrangement, and the mix/effects switching system using the arrangement, offers versatility and convenience which prior art arrangements and systems do not afford.

Although several embodiments have been described, this was for the purpose of illustrating, but not limiting, the invention. Various modifications, which will come readily to the mind of one skilled in the art, are within the scope of the invention as defined in the appended claims.

I claim:

1. A mix/effects switch arrangement comprising:
   a plurality of switches, each of said switches comprising two input terminals, an output terminal and a control terminal;
   one of said switches comprising an output switch;
   a first number of said plurality of switches being serially arranged to provide a first feedline to one input terminal of said output switch;
   a second number of said plurality of switches being serially arranged to provide a second, parallel, feedline to the other input terminal of said output switch;
   said output switch comprising a soft switch.

2. A mix/effects switch arrangement as defined in claim 1 wherein said plurality of switches comprises five switches;
   said first number comprising a second switch and a third switch and said second number comprising a fourth switch and a fifth switch;
   the output terminal of said second switch being connected to one input terminal of said third switch, the output terminal of said third switch being connected to one input terminal of said output switch;
   the output terminal of said second switch being connected to one input terminal of said fifth switch, the output terminal of said fifth switch being connected to the other output terminal of said output switch.

3. A mix/effects switch arrangement as defined in claim 2 wherein the other input terminals of said second and fourth switches are connected together.

4. A mix/effects switch arrangement as defined in claim 3 wherein the other input terminals of said third and fifth switches are connected together.

5. A mix/effects switch arrangement as defined in claim 2 wherein said second and fourth switches comprise soft switches.

6. A mix/effects switch arrangement as defined in claim 5 wherein said third and fifth switches comprise soft switches.

7. A mix/effects switch arrangement as defined in claim 5 wherein said third and fifth switches comprise hard switches.

8. A mix/effects switching system comprising:
   a mix/effects switch arrangement including:
   a plurality of switches, each of said switches comprising two input terminals, an output terminal and a control terminal;
   one of said switches comprising an output switch;
   a first number of said plurality of switches being serially arranged to provide a first feedline to one input terminal of said output switch;
   a second number of said plurality of switches being serially arranged to provide a second, parallel, feedline to the other input terminal of said output switch;
   said output switch comprising a soft switch.

9. A mix/effects switching system as defined in claim 8 wherein said plurality of switches comprises five switches;
   said first number comprising a second switch and a third switch and said second number comprising a fourth switch and a fifth switch;
   the output terminal of said second switch being connected to one input terminal of said third switch, the output terminal of said third switch being connected to one input terminal of said output switch;
   the output terminal of said fourth switch being connected to one input terminal of said fifth switch, the output terminal of said fifth switch being connected to the other output terminal of said output switch;
   a source of first background video signal connected to one input terminal of said second switch and a source of second background video signal connected to one input terminal of said fourth switch, and a source of foreground video signal connected in common to the other input terminals of said second and fourth switches; and
   a fourth source of video matte signal connected in common to the other input terminals of said third and fifth switches.

10. A mix/effects switching system as defined in claim 9 and comprising:
    a chroma key or split screen source connected in common to the control terminals of said second and fourth switches;
    a title source connected in common to the control terminals of said third and fifth switches; and
    fader lever and mode selector means connected to the control terminal of said output switch.

11. A mix/effects switching system as defined in claim 10 and further comprising three push button means connected to a logic control circuit;
    the output of said logic control circuit being connected to the control terminals of said second, third, fourth and fifth switches;
    whereby to activate a selected one or more of said second, third, fourth and fifth switches in dependence on the push buttons depressed in accordance with a prearranged program.

* * * * *